United States Patent Office 3,518,668
Patented June 30, 1970

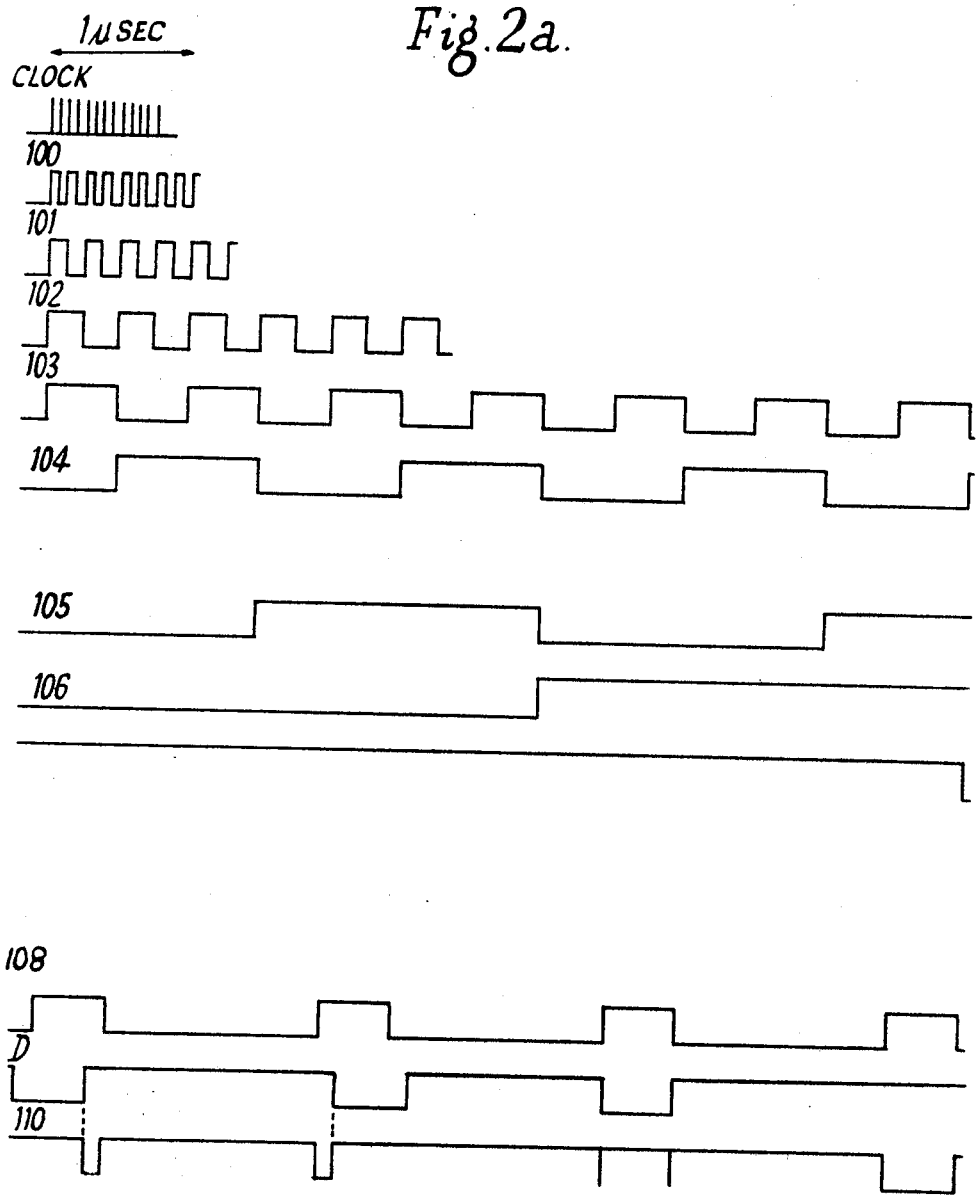

3,518,668
SECONDARY RADAR SYSTEMS
Geoffrey George Woollvin, Harlow, Essex, England, assignor to A. C. Cossor Limited, Harlow, Essex, England
Filed Mar. 12, 1969, Ser. No. 806,608
Claims priority, application Great Britain, Mar. 11, 1969, 13,747/69
Int. Cl. G01s 9/56
U.S. Cl. 343—6.8                                    7 Claims

ABSTRACT OF THE DISCLOSURE

In a secondary radar transponder the received interrogation pulse group is recognised by comparing this group with a comparison group which is generated with the correct widths and spacings in response to the first received pulse. Error pulses are generated where the two groups do not match and the error pulses are integrated. The interrogation group is accepted only if the requisite number of pulses (e.g. four pulses in Mode 4, to which the invention is particularly applicable) are received and counted without the integrated signal level exceeding a predetermined threshold.

---

Figure 1:
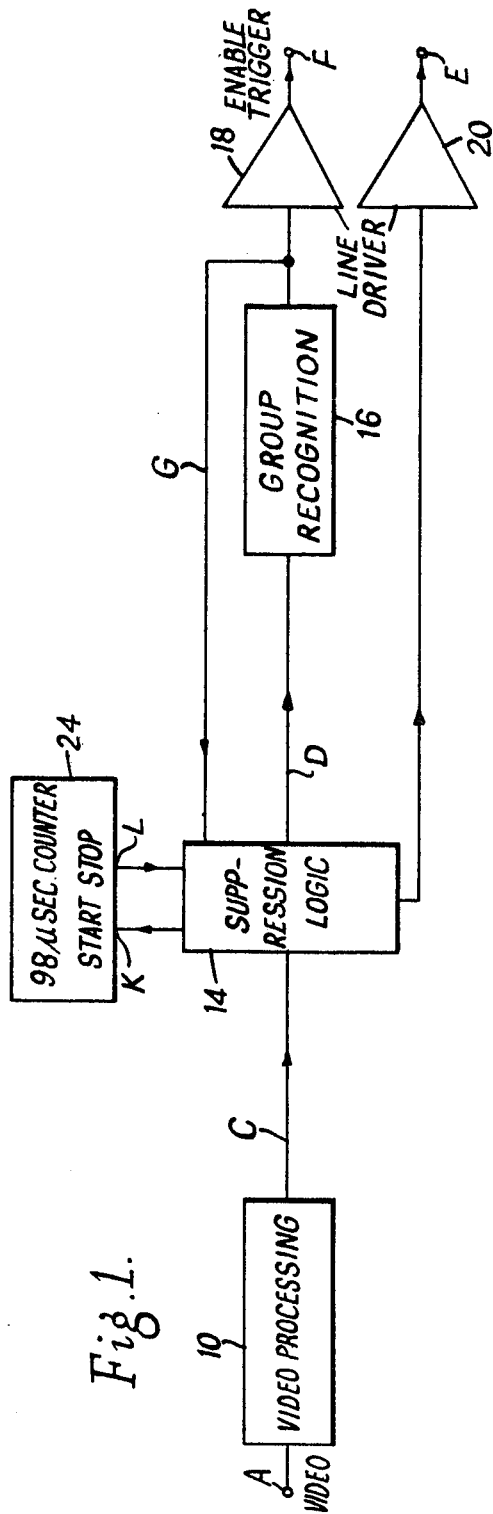

This invention relates to seconary radar systems which are well known in surveillance radar systems used for air traffic control purposes and have the advantages that the return signals are not echoes, and are therefore substantially stronger than the return signals in primary radar systems, and the return signals can be coded to identify the source of each return signal.

A secondary radar system comprises a ground station and a plurality of transponders. The transponders are mounted in the aircraft to be controlled and the ground station transmits interrogating signals to which only the transponders within the small sector covered by the main beam of the directional aerial at the ground station respond to send back return signals.

Each transponder consists essentially of a receiver, a control unit, a modulator and a transmitter. The receiver receives and amplifies the interrogating signals and passes these to the control unit. The control unit has two main functions. The first is to reject received pulses which do not comply with certain conditions and in particular to reject pulses whose characteristics indicate that they emanate from a side lobe rather than the main beam of the transmitting antenna at the ground station. The second main function of the control unit is to recognise the group of pulses identifying a particular mode of secondary radar operation, as explained in more detail below.

When the control unit accepts an interrogation signal it causes the modulator to provide the correct return code signal which is transmitted back to the ground station by the transmitter, usually on a frequency different from that of the interrogating signal. In the case of Mode 4 the interrogation signal includes an information code which is passed to a data processing computer which responds to the coded information to determine the return code.

The interrogating signal takes the form of a group of pulses whose number and spacing (i.e. leading edge to leading edge) determine the secondary radar mode being used. In Mode 4 this group is followed by a train of pulses which occupy selected ones of a number of predetermined pulse positions. The combination of pulses actually transmitted in this train constitutes the coded information which is used to ask a particular question. Any aircraft in the main beam then transmits back the appropriate answer.

In the early days of secondary radar only two pulses were utilized, one pulse (control pulse) being transmitted by a nondirectional aerial and the other (interrogation pulse) by a directional aerial. If the transponder is on the main beam of the directional aerial the pulse received therefrom will have a similar amplitude to the control pulse from the non-directional aerial. If the transponder is on a side lobe the interrogation pulse will be substantially smaller than the control pulse. It is on this basis that the transponder discriminates between interrogations effected by way of the main beam and interrogations effected by way of a side lobe, and thus effects what is known as side lobe suppression.

For some years now it has been common to operate secondary radar systems with three pulses in the interrogation group. $P_1$ and $P_3$ are interrogation pulses and $P_2$ is the control pulse. On a main lobe $P_1$ and $P_3$ are substantially greater than $P_2$. On a side lobe $P_1$ and $P_3$ are not greater than $P_2$. Whether two or three pulses are employed, particular spacings between pulses in the group is specified for each mode.

More recently military specifications for secondary radar systems have been extended to cover Mode 4 systems in which an initial group identifying the mode consists of four pulses spaced at 2 $\mu$s. intervals with a pulse width of 0.5 $\mu$s. These four pulses are followed by a sidelobe suppression pulse.

In a Mode 4 system these five pulses may be followed by as many as 32 additional pulses spaced as close as 2 $\mu$s., these pulses carrying the coded interrogation information.

The present invention is concerned particularly with the transponder control unit. Known control units used to handle civil Modes A, B, C and D and military Modes 1, 2 and 3 are not well suited to handle Mode 4. The control unit to be described hereinafter is specifically designed to handle Mode 4, but it is also suitable with the necessary adaptations to meet the different pulse widths and spacings of the earlier modes to handle these other modes also.

The control units of known secondary radar transponders recognise the correct pulse spacing for a given mode by delaying one pulse of the initial pulse group by the amount of the spacing to the next pulse, and then testing for coincidence between the said next pulse and the delayed one pulse. In the past this has been done by means of tapped delay lines, but these are bulky. In recent years tapped delay lines have been replaced by equivalent shift registers. The number of stages required in a shift register capable of handling Mode 4 is too large however, leading to excessive cost.

According to the present invention, a secondary radar transponder control unit comprises means responsive to the first pulse of a received group effectively to generate a comparison group of pulses having the widths and spacings corresponding to a given mode, means for comparing the received group with the comparison group to generate error pulses where the two said groups are not in register, means for integrating the error pulses and threshold means operative when the integrated error pulses exceed a predetermined level to reject the interrogation signal.

However simple or complex the interrogating group of pulses may be, it is a relatively straightforward matter to generate the corresponding comparison group and this group can be gated with the received group to affect the aforementioned comparison. A simple RC integrating circuit may be connected to the output of the gating means, and when the signal on the capacitator exceeds a threshold level, this is an indication that the received group does not comply with the requirements of the mode in question.

Figure 2:
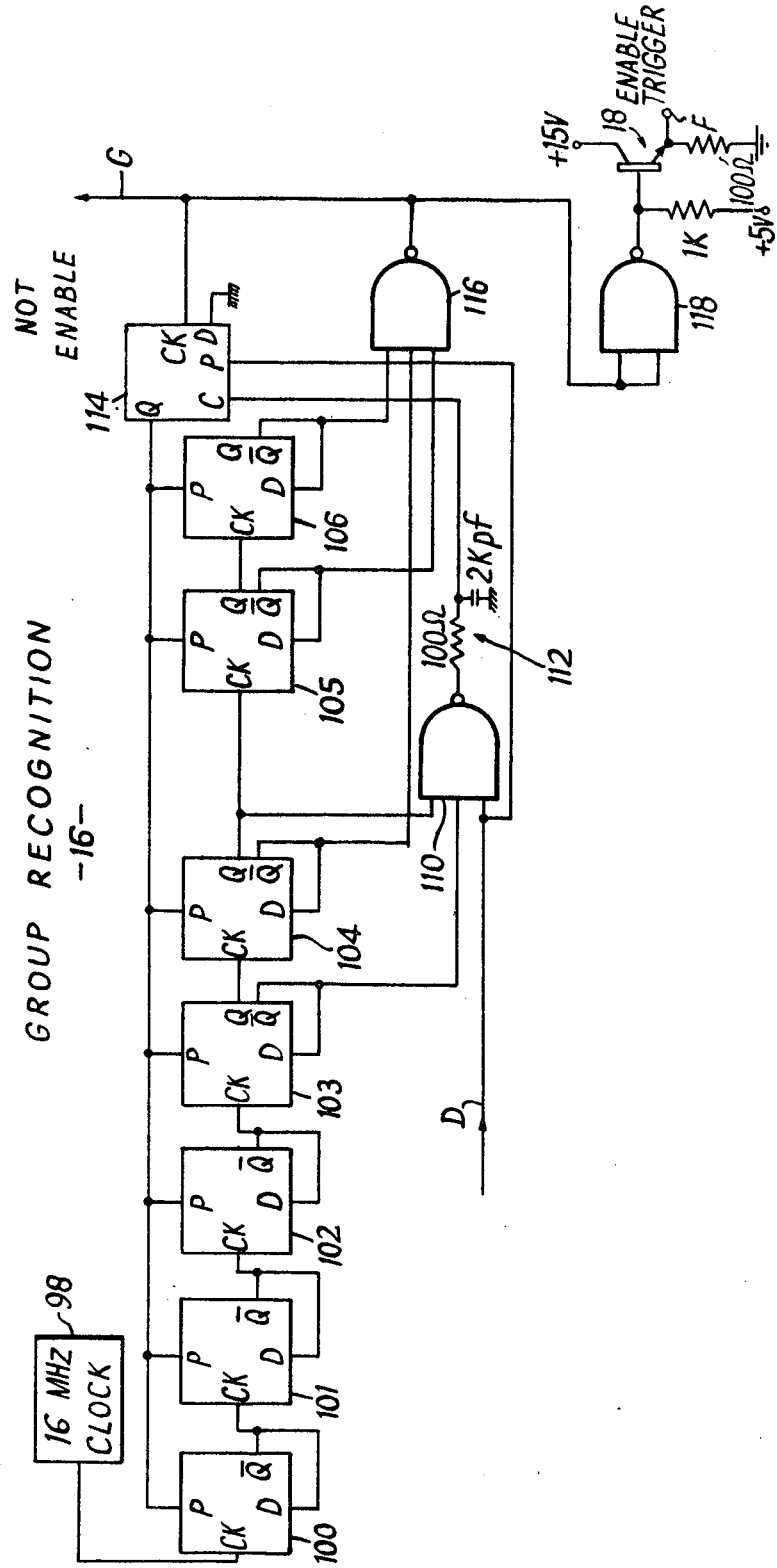

The invention will be described in more detail by way of example with reference to the accompanying drawings in which:

FIG. 1 is a block diagram of relevant parts of a control unit embodying the invention, FIG. 2 is a circuit diagram of the pulse group recognition part of the unit, and FIG. 2a shows waveforms used in explaining the operation of FIG. 2 respectively.

Referring to FIG. 1, the incoming interrogation signal from the receiver is available on terminal A which is connected to a video processing unit 10 which only passes pulses to an output line C which comply with the requirements as to pulse width and relative amplitudes specified for Mode 4.

The output pulses of line C are fed to suppression logic 14 which is used to suppress the operation of various circuits during certain phases of operation and in particular when a group has been correctly recognised. Normally the pulses from line C are passed by the suppression logic 14 to line D which provides the input to the group recognition circuitry 16. This circuitry tests whether the group of pulses have the correct spacings and, if this is the case, a signal is passed through a line-driver 18 to an enable trigger terminal F. This terminal is connected to the computer and prepares this to respond to the interrogation signal which is passed from the suppression logic 14 via a line-driver 20 to a challenge video terminal E. The computer responds to the pulses thus presented at terminal E and, if correctly interrogated causes the transmission back to the ground station of a suitably coded reply. It may be mentioned at this stage that the computer, like the receiver, modulator and transmitter, may be of known form as found in existing secondary radar systems. Therefore these other main units of the transponder, with which the present invention is not directly concerned, are not described.

The inverse of the signal available on the enable trigger terminal F is present on a not enable line G which provides an input to the suppression logic 14. In normal operation of the suppression logic 14, when the not enable signal on line G goes false, the logic 14 applies a start signal by way of terminal K to a counter 24 which runs for a predetermined suppression interval and then applies a pulse back to the logic 14 by way of terminal L to terminate the suppression interval.

The group recognition circuit 16 is shown in FIG. 2 and comprises a clock oscillator 98 driving a chain of bistable flip-flops 100 to 106. For interrogation pulses 2 $\mu$s. wide, the oscillator 98 should nominally have a period of 16 mHz.

The flip-flops 100 to 106 repeatedly divide down the frequency by 2 and the output of the flip flop 104 is at .5 mHz. The flip flop 104 is driven from the inverted output of the 1 mHz. stage 103 so that the pulse provided by the stage 104 is completely clear of the required edge of the pulse from the stage 103. The outputs of the clock oscillator and the flip flops are shown in FIG. 2a of the drawings, the outputs of the flip flops being designated by the same reference numerals as the flip flops themselves.

The waveforms 103 and 104 are applied together to a NAND gate 110 and the combined input function at the gate is represented by the wave form 108 in FIG. 2a. This waveform constitutes the comparison group of pulses 0.5 $\mu$s. wide and spaced 2 $\mu$s. apart. It will be appreciated that the waveform 108 does not actually exist but, by virtue of the simultaneous application of waveforms 103 and 104 to two inputs of the gate 110, the waveform 108 effectively exists.

The interrogation group on the line D is also applied to the gate 110. The output of the gate 110 is represented by the same numeral in FIG. 2a and consists of small pulses where the comparison group and the interrogation group do not match. These pulses are integrated by an RC integrator circuit 112 and, if the output of the integrator circuit rises sufficiently, the operation of the group recognition circuit is terminated, and the interrogation is thus not accepted.

The operation of the group recognition circuit is controlled by a flip flop 114 which normally presets all of the flip flops 100 to 106. The first pulse received on line D pre-sets the flip flop 114 and removes the pre-setting input to the flip flops 100 to 106.

Accordingly the counter constituted by these flip flops can run to produce the waveforms discussed above. Should the signal on the integrating circuit 112 rise sufficiently, the flip flop 114 is cleared and the pre-setting input on the flip flops 100 to 106 is reimposed.

Referring again to the waveform 110 in FIG. 2a, the small pulses produced because of positional displacements of the first two pulses in the waveform D will be insufficient to clear the flip flop 114, because of the threshold of the clear input to the flip-flop. The third pulse in the waveform D is correctly positioned and obviously no clearing will take place in this instance. However, in the example shown, the fourth pulse in the waveform D is missing, and accordingly an output pulse in the waveform 110 appears of the full duration of 0.5 $\mu$s. This is more than enough to cause the output of the integrator circuit 112 to rise sufficiently to clear the flip flop 114.

The time constant of the integrator circuit 112 is less than the width of the pulses, i.e. less than 0.5 $\mu$s. The integrator discharges completely in between successive 2 $\mu$s. pulses.

For an interrogation to be accepted the flip flop 114 must remain pre-set until four pulses have been emitted by the flip flop 104. Such pulses are counted by the remaining flip flops 105 and 106. This counting is done indirectly by counting the stage 104 because, should an error be excessive, it will stop the system before 104 can rise. The flip flops 105 and 106 are triggered from the inverted outputs of the preceding flip flops so that, by gating to recognise 105 and 106 both true, the fourth successive pulse 104 can be gated through to an output to initiate triggering. The gating is performed by a NAND gate 116 whose output constitutes the not enable signal on line G. This output is applied also to the clock input of the flip flop 114, and the rising trailing edge of the pulse passed by the gate 116 clears the flip flop 114 so that the system stops when the enable trigger is finished.

The output of the gate 116 is inverted by a NAND gate 118 and applied through the line driver 18 to the enable trigger terminal F. If therefore the group of four interrogation pulses exists correctly the signal on terminal F triggers the computer to process the pulses which it receives via line E (FIG. 1). These pulses of course include the four mode pulses which will be followed by a fifth pulse if the interrogation was effected on a side-lobe. The computer effects side-lobe suppression in that it is programmed to reject an interrogation comprising five successive pulses at the 2 $\mu$s. spacing.

I claim:

1. A secondary radar transponder control unit for checking the spacings of interrogation pulses comprising the combination of means responsive to the first pulse of a received group effectively to generate a comparison group of pulses having the widths and spacings corresponding to a given mode, means for comparing the received group with the comparison group to generate error pulses where the two said groups are not in register, means for integrating the error pulses and threshold means operative when the integrated error pulses exceed a predetermined level to reject the interrogation signal.

2. A control unit according to claim 1, comprising a chain of bistable flip-flops which repeatedly divide down the frequency of an oscillator, and gating means responsive both to the outputs of a plurality of the flip-flops and to the received group to generate the error pulses.

3. A control unit according to claim 2, comprising a bistable control flip-flop operative in one state to preset the flip-flops in the said chain and in the other state to allow the flip-flops in the chain to count in response to the oscillator, the control flip-flop being responsive to the first pulse of a received group to switch to the said other state and to the integrating means to switch to the said one state when the integrated error pulses exceed the predetermined level.

4. A control unit according to claim 2, comprising a plurality of further bistable flip-flops arranged to count pulses from the last flip-flop of the said chain and output gating means responsive to a particular state of the further flip-flops to provide an output signal enabling a reply to the interrogation.

5. A control unit according to claim 3, comprising a plurality of further bistable flip-flops arranged to count pulses from the last flip-flop of the said chain and output gating means responsive to a particular state of the further flip-flops to provide an output signal enabling a reply to the interrogation, and wherein the control flip-flop also responds to the output signal to switch to the said one state.

6. A control unit according to claim 4, wherein the output gating means is additionally responsive to the last flip-flop of the said chain to provide the output signal only when the said last flip-flop is in its state other than that which applies in effectively generating the comparison group of pulses.

7. A control unit according to claim 1, wherein the integrating means is an RC integrating circuit.

References Cited

UNITED STATES PATENTS

| | | |
|---|---|---|
| 3,178,705 | 4/1965 | Clock et al. |
| 3,178,706 | 4/1965 | Clock. |
| 3,182,310 | 5/1965 | Humpherys. |
| 3,341,845 | 9/1967 | Deman. |

RICHARD A. FARLEY, Primary Examiner

M. F. HUBLER, Assistant Examiner